United States Patent
Sinha et al.

(10) Patent No.: US 10,805,216 B2
(45) Date of Patent: *Oct. 13, 2020

(54) SHARED SERVICE ACCESS FOR MULTI-TENANCY IN A DATA CENTER FABRIC

(71) Applicant: Cisco Technology, Inc., San Jose, CA (US)

(72) Inventors: Satyam Sinha, Sunnyvale, CA (US); Smita Rai, Mountain View, CA (US); Kit Chiu Chu, Fremont, CA (US); Ashutosh Agrawal, Fremont, CA (US); Wanli Wu, Sunnyvale, CA (US); Ravikanth Nasika, Fremont, CA (US); Thomas J. Edsall, Los Gatos, CA (US); Geetha Anandakrishnan, Sunnyvale, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/367,868

(22) Filed: Mar. 28, 2019

(65) Prior Publication Data

US 2019/0222516 A1 Jul. 18, 2019

Related U.S. Application Data

(63) Continuation of application No. 15/145,647, filed on May 3, 2016, now Pat. No. 10,320,672.

(51) Int. Cl.
*H04L 12/741* (2013.01)
*H04L 12/715* (2013.01)
*H04L 12/713* (2013.01)
*H04L 29/08* (2006.01)
*H04L 12/46* (2006.01)
*H04L 12/751* (2013.01)

(52) U.S. Cl.
CPC ............ *H04L 45/745* (2013.01); *H04L 45/04* (2013.01); *H04L 45/54* (2013.01); *H04L 45/586* (2013.01); *H04L 45/74* (2013.01); *H04L 67/10* (2013.01); *H04L 12/4641* (2013.01); *H04L 45/02* (2013.01); *H04L 67/20* (2013.01)

(58) Field of Classification Search
None
See application file for complete search history.

(56) References Cited

U.S. PATENT DOCUMENTS

| 10,320,672 | B2* | 6/2019 | Sinha ................. H04L 45/586 |
| 2004/0193677 | A1 | 9/2004 | Dar et al. |
| 2006/0013209 | A1* | 1/2006 | Somasundaram .. H04L 12/4675 370/389 |

(Continued)

FOREIGN PATENT DOCUMENTS

EP 1634428 B1 1/2008

*Primary Examiner* — Jay L Vogel (57) ABSTRACT

Aspects of the embodiments include receiving a packet at a network element of a packet-switched network; identifying a presence of a shared service destination address in a header of the packet; identifying a shared service destination address for the packet based, at least in part, on a destination internet protocol (IP) address stored in a forward information base; and forwarding the packet to the shared service destination address.

20 Claims, 6 Drawing Sheets

(56) References Cited

U.S. PATENT DOCUMENTS

| | | | |
|---|---|---|---|
| 2009/0092137 A1* | 4/2009 | Haigh | H04L 12/4641 |
| | | | 370/392 |
| 2010/0027549 A1 | 2/2010 | Satterlee et al. | |
| 2010/0150072 A1 | 6/2010 | Ishii et al. | |
| 2010/0329265 A1 | 12/2010 | Lapuh et al. | |
| 2012/0263035 A1* | 10/2012 | Nakanishi | H04L 45/02 |
| | | | 370/225 |
| 2013/0033978 A1* | 2/2013 | Eckert | H04L 45/16 |
| | | | 370/216 |
| 2014/0064091 A1* | 3/2014 | Basso | H04L 45/742 |
| | | | 370/235.1 |
| 2017/0324660 A1 | 11/2017 | Sinha et al. | |

* cited by examiner

FIG. 5

SHARED SERVICE ACCESS FOR MULTI-TENANCY IN A DATA CENTER FABRIC

CROSS-REFERENCE TO RELATED APPLICATIONS

This application is a continuation of U.S. patent application Ser. No. 15/145,647, filed May 3, 2016, the entire contents of which is incorporated herein by reference.

TECHNICAL FIELD

This disclosure pertains to shared service access across multiple tenants in a data center fabric.

BACKGROUND

In a data center fabric with multiple tenants in their own virtual routing and forwarding (VRF) instances, each tenant may need to access a set of common servers providing services such as DNS, NTP, etc. which are typically in global IP space.

Multiple tenancy support can involve leaking routes to these servers in each of the tenants which requires a high number of software and hardware entries. The scale of expanded entries can be high when dealing with a high number of tenants and a high number of such service routes and hence causes scaling and convergence issues.

DETAILED DESCRIPTION

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Aspects of the embodiments are directed to receiving a packet at a network element of a packet-switched network; identifying a presence of a shared service destination address in a header of the packet; identifying a shared service destination address for the packet based, at least in part, on a destination internet protocol (IP) address stored in a forward information base; and forwarding the packet to the shared service destination address.

Aspects of the embodiments are directed to a network element. The network element can include an application specific integrated circuit (ASIC) comprising a forwarding information base (FIB). The FIB can include a tenant-specific region storing tenant-specific destination address information populated based on tenant-specific virtual forwarding and routing (VRF) instances; and a shared service region storing global shared service destination address information populated based on a shared service VRF, the shared service region comprising a next hop destination for a shared service network destination.

Aspects of the embodiments are directed to a data center fabric. The data center fabric can include a network element configured to receive a packet from a tenant server, the network element that includes an application specific integrated circuit (ASIC) comprising a forwarding information base (FIB). The FIB can include a tenant-specific region storing tenant-specific destination address information populated based on tenant-specific virtual forwarding and routing (VRF) instances; and a shared service region storing global shared service destination address information populated based on a shared service VRF, the shared service region comprising a next hop destination for a shared service network destination. The data center fabric can include a shared services network element comprising a shared services server configured to receive a packet; and determine whether to apply shared services to the packet based, at least in part, on an endpoint group tag located in the packet metadata.

Some embodiments may include identifying a source internet protocol (SIP) address for the packet; identifying a destination internet protocol (DIP) address for the packet, the DIP address comprising an IP address for a shared service network destination; determining a shared service tag for the shared service network destination, the shared service tag identifying one or more shared services associated with the SIP address of the packet; and applying the shared service tag to an endpoint group tag associated with the SIP address for the packet.

Some embodiments may include performing a lookup in a forwarding information base (FIB) for destination address for the packet based on a tenant-specific virtual routing and forwarding (VRF); identifying a shared service VRF for the packet; and performing a shared service destination address lookup in the FIB using the shared service VRF.

In some embodiments, performing a FIB lookup comprises performing a FIB lookup in a dedicated shared services region of the FIB.

Some embodiments may include deriving a tenant-specific VRF instance based on information in the packet; deriving a shared service VRF instance; and populating a shared service VRF and a tenant-specific VRF in a forwarding information base (FIB) key.

Some embodiments may include performing a shared service lookup in a shared service region of the FIB using the shared service VRF; and performing a tenant-specific lookup in a tenant-specific region of the FIB using the tenant-specific VRF.

In some embodiments, the data center fabric is configured to receive a packet at a network element of a packet-switched network; identify a presence of a shared service destination address in a header of the packet; identify a shared service destination address for the packet based, at least in part, on a destination internet protocol (IP) address stored in a forward information base; and forward the packet to the shared service destination address.

In some embodiments, the data center fabric is configured to identify a source internet protocol (SIP) address for the packet; identify a destination internet protocol (DIP) address for the packet, the DIP address comprising an IP address for a shared service network destination; determine a shared service tag for the shared service network destination, the shared service tag identifying one or more shared services associated with the SIP address of the packet; and apply the shared service tag to an endpoint group tag associated with the SIP address for the packet.

In some embodiments, the data center fabric is configured to perform a lookup in a forwarding information base (FIB) for destination address for the packet based on a tenant-specific virtual forwarding and routing (VRF); identify a shared service VRF for the packet; and perform a shared service destination address lookup in the FIB using the shared service VRF.

In some embodiments, performing a FIB lookup comprises performing a FIB lookup in a dedicated shared services region of the FIB.

In some embodiments, the data center fabric is configured to derive a tenant-specific VRF instance based on information in the packet; derive a shared service VRF instance; and populate a shared service VRF and a tenant-specific VRF in a forwarding information base (FIB) key.

In some embodiments, the data center fabric is configured to perform a shared service lookup in a shared service region of the FIB using the shared service VRF; and perform a tenant-specific lookup in a tenant-specific region of the FIB using the tenant-specific VRF.

In addition to scalability issues, applying flow-based network access policies using an End-point group (EPG) based scheme as in application centric infrastructure (ACI) using virtual extensible local area network (VxLAN) or other tag based scheme can also be problematic. With VxLAN-GBP (VxLAN with Group Based Policies), packets carry the tags identifying clients of the shared services to the egress top-of-rack (ToR) switch, which can apply policies. As tenants have independent space for the tags, it is possible that multiple tenants may be using the same tags in their VRF instances for different policies. If the provider wants to apply policies based on the tags carried in VxLAN-GBP headers it may lead to collision of tags as the tags may belong to other end point groups with different policies in the providers' VRF.

Having to continuously burn shared service IP entries in the FIB per VRF can be cumbersome. This disclosure describes a shared service region in FIB can be used that can be shared by multiple tenants. Once the tenant VRF is derived, the shared service VRF can be derived that can be accessed by multiple tenants during routing and forwarding of packets. Both the shared service VRF and regular tenant VRF can be populated in the FIB key. During FIB lookup, the regular tenant FIB region uses tenant VRF to do FIB lookup, and the shared service region uses shared service VRF to do the FIB lookup. A packet to a shared service destination, no matter what tenant VRF it is from, will be a hit in this shared service FIB region and the next hop is taken.

A resulting flow can resemble the following:
VRF_T=Tenant VRF, VRF_S=Shared service VRF, SS_IP=Shared service IP:
VRF_T→VRF_S (VRF_S derived from VRF_T)
VRF_S, SS_IP→Next hop (Next hop identified from VRF_S and SS_IP stored in shared service region of FIB).

Thus, SS_IP only needs to be programmed once in its VRF and not in each tenant VRF.

Routes pointing to shared services can be marked with a special flag. For a packet from a source destined to these shared service IPs, there can be an alternate End-point Group (EPG) tag programmed in the FIB which is carried in the packet only when the packet's shared service destination matches the IP route configured with this special flag. This results in EPG tag translation when packet flows from consumer VRF to provider VRF.

This translated tag is given to the end-point groups based on the combination of services it can access. For example, end-point groups which can access DNS and NTP are given tag X. Those packets that can only access DNS will get tag Y. In the service provider VRF there are rules to say if X, then allow DNS and NTP, but only DNS allow if Y.

With this shared services framework, there is an expectation of significant improvement in convergence of routing as this scheme avoids route-leaking. In addition, the system is amenable to scale up and to utilize a high number of shared services with a high number of tenants that was not possible previously.

Providers may also perform access control using security policies for incoming packets from various tenants.

Figure 1:
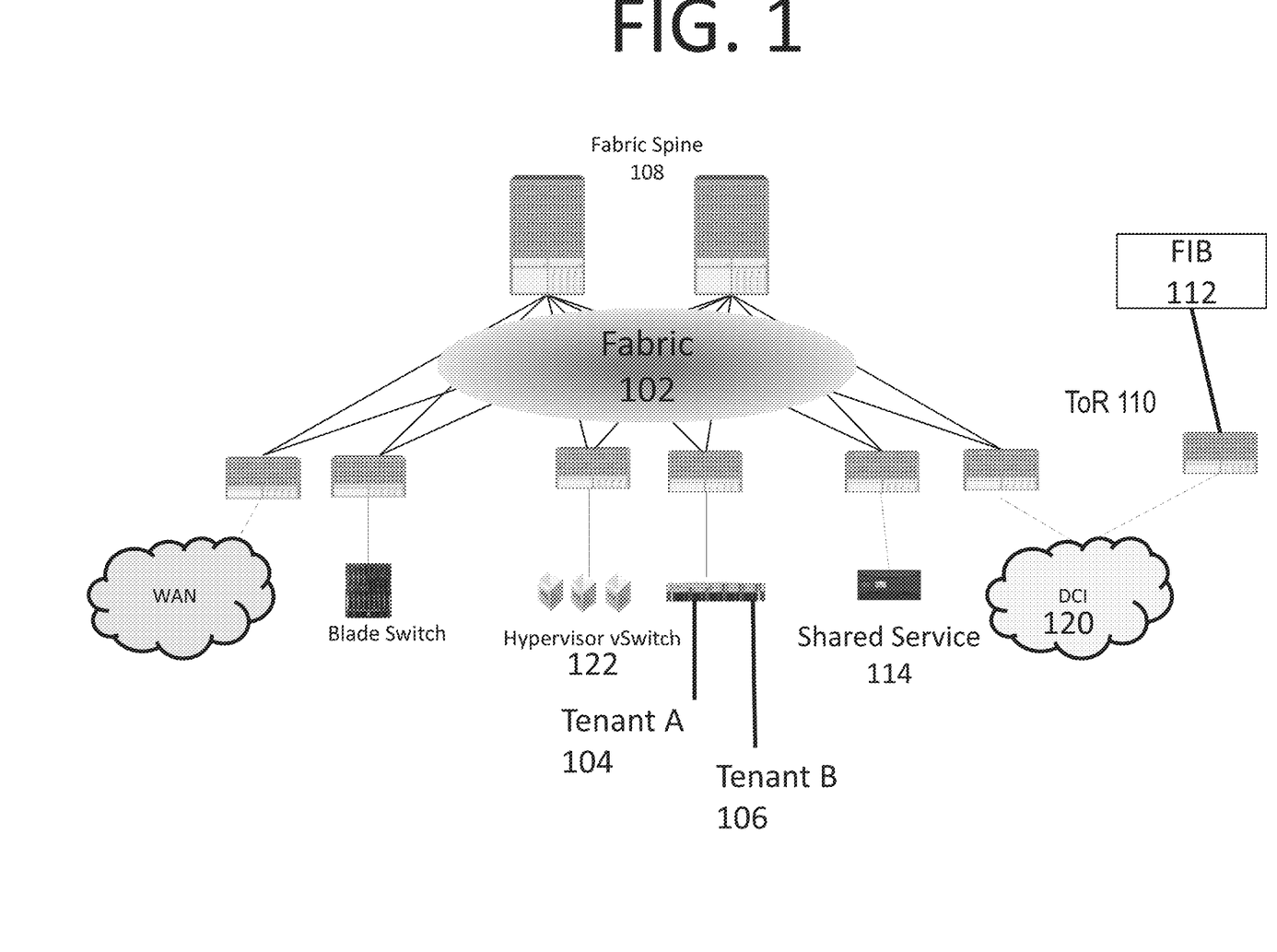
FIG. 1 is a schematic block diagram of a data center fabric supporting shared service across multiple tenants in accordance with embodiments of the present disclosure.

FIG. 1 is a schematic block diagram of a data center fabric 100 supporting shared service across multiple tenants in accordance with embodiments of the present disclosure. The data center fabric 100 can be a CLOS network or other similar network configuration. The data center fabric 100 can support multiple tenants, such as Tenant A 104 and Tenant B 106. The data center fabric 100 can include a network fabric 102 that interconnects network elements through a fabric spine 108. The tenants can be connected to top of rack (TOR) switches 110. Each TOR 110 can include a forwarding information base (FIB) 112. FIB 112 includes an allocation for shared service address information that can be accessed by any tenant packet that arrives at the TOR 110 and that needs destination address resolution. The FIB 112 also includes a tenant-specific region for tenant-specific destination address lookup. One or more shared services 114 can be hosted by other network elements within the data center fabric 100, which are accessible by incoming packets, depending on access rights associated with a tenant or with an endpoint group or security group of the tenant.

The data center fabric can include a data center interconnect 120 that can facilitate communications between network elements within the data center fabric 100. The data center fabric 100 can also include a hypervisor 122 that is configured to establish and tear down segmented virtual networks to support multitenancy.

Certain terminologies are used with regard to the various embodiments of communication system 10. As used herein, the term "host" may include any network element, physical or virtual, connected to other network elements over a network. Hosts may provide data and other services to the network elements. In a client-server model, hosts may include servers. In a peer-to-peer network, each computer may be a host. Hosts may also include computers participating in networks that use Internet Protocol (IP). In a general sense, each host has a specific, unique address (e.g., IP address) associated therewith. Hosts can include physical computers (e.g., servers), and virtual machines (VMs).

As used herein, the term "network element" can encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "switch" is inclusive of routers, switches and such other network elements with packet routing, bridging, and switching functionalities that are directly connected to one or more hosts. The term "fabric spine" is inclusive of routers, switches and such other network elements with packet routing, bridging, and switching functionalities that connect one or more leaf switches.

Traditionally, in a three-tier network architecture with core, aggregation, and access layers, Layer 2 forwarding (e.g., using Media Access Control (MAC) address) occurs within the access layer, and Layer 3 forwarding (e.g., using Internet Protocol (IP) address) occurs within the aggregation and core layers. Traditionally, hardware-based learning was confined to Layer 2 MAC address learning at the access layer for quicker convergence, eliminating any software intervention that could cause significant delays and working in a plug-n-play fashion. However, massively scalable data center environments (MSDC) generally have millions of servers with any-to-any communication capability. Layer 3 uses hierarchical IP addressing with longest prefix matching (LPM) and can therefore scale better than Layer 2; thus, the need to limit broadcast domains has resulted in MSDC architectures using Layer 3 Top of Rack (ToR) switches.

Turning to the differences between Layer 2 and Layer 3 switching, a Layer 2 switch learns the incoming packet's source MAC address against the interface, on which it received the packet. The association between the source MAC address and the interface is written to a forwarding table typically called Layer 2 forwarding table or the MAC table. The terms "packet" and "frame" may be interchangeably used in this Specification to refer to formatted data units transmitted in the network. When the Layer 2 switch subsequently receives a frame (e.g., a data unit at Layer 2) with a destination MAC address in its forwarding table, it sends the frame out the interface stored in the forwarding table. If the Layer 2 switch has not seen the MAC address yet, it floods the frame out of the active interfaces (e.g., as is also done with broadcast frames), except for the interface on which the frame was received. Layer 2 MAC address based forwarding algorithm may be implemented in hardware (e.g., in a switching chip).

The term "router" may be used in this Specification to refer to a network element that forwards packets using, e.g., Layer 3 parameters (e.g., IP address). Layer 3 switches may perform IP switching (rather than MAC switching) at the hardware level. In Layer 3 switching, a Forwarding Information Base (FIB) table in hardware (e.g., a suitable memory element) maintains a platform specific image of the forwarding information contained in an IP routing table. IP forwarding in Layer 3 switches can involve topology-based switching, in which the Layer 3 switch builds a lookup table (i.e., IP routing table) and populates it with the entire network's topology. The database can be held in hardware and referenced there to maintain high throughput. The routers may run routing protocols such as Open Shortest Path First (OSPF) or Routing Information Protocol (RIP) to communicate with other Layer 3 switches or routers and build their IP routing tables. When routing or topology changes occur in the network, the IP routing table is updated, and those changes are reflected in the FIB. The FIB maintains next hop address information based on the information in the IP routing table.

Figure 2:
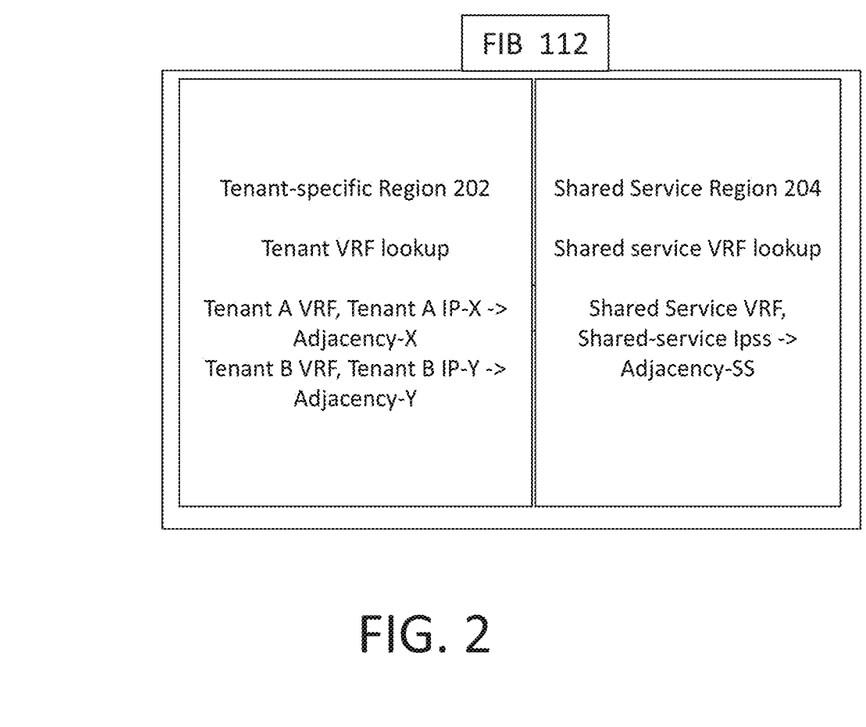
FIG. 2 is a schematic block diagram of a forward information base of a network element in accordance with embodiments of the present disclosure.

FIG. 2 is a schematic block diagram of a forward information base (FIB) 112 of a network element in accordance with embodiments of the present disclosure. FIB 112 can be part of an application specific integrated circuit (ASIC). The ASIC can reside in a top of rack (TOR) or end of rack (EOR) network element, which can be part of a network switch or data center server.

The FIB 112 can include a dedicated shared service region 204 containing destination address information for forwarding a packet to a shared service network location. For example, the shared service region 204 can include an IP address for shared service servers located within the data center network. The packet can then be forwarded to the shared service server (e.g., the next hop) if there is a hit in the shared service region of the FIB 112. The shared services region 204 can include IP addresses associated with shared service servers and associated with the global address space. The IP addresses can be hard coded or burned into the shared services region 204 prior to receiving a packet, such as during setup of the TOR.

Additionally, the FIB 112 includes one or more tenant-specific regions 202. Tenant-specific regions 202 can be hardcoded with IP addresses for data center servers own, managed, or otherwise associated with the specific tenant's address space.

Figure 3:
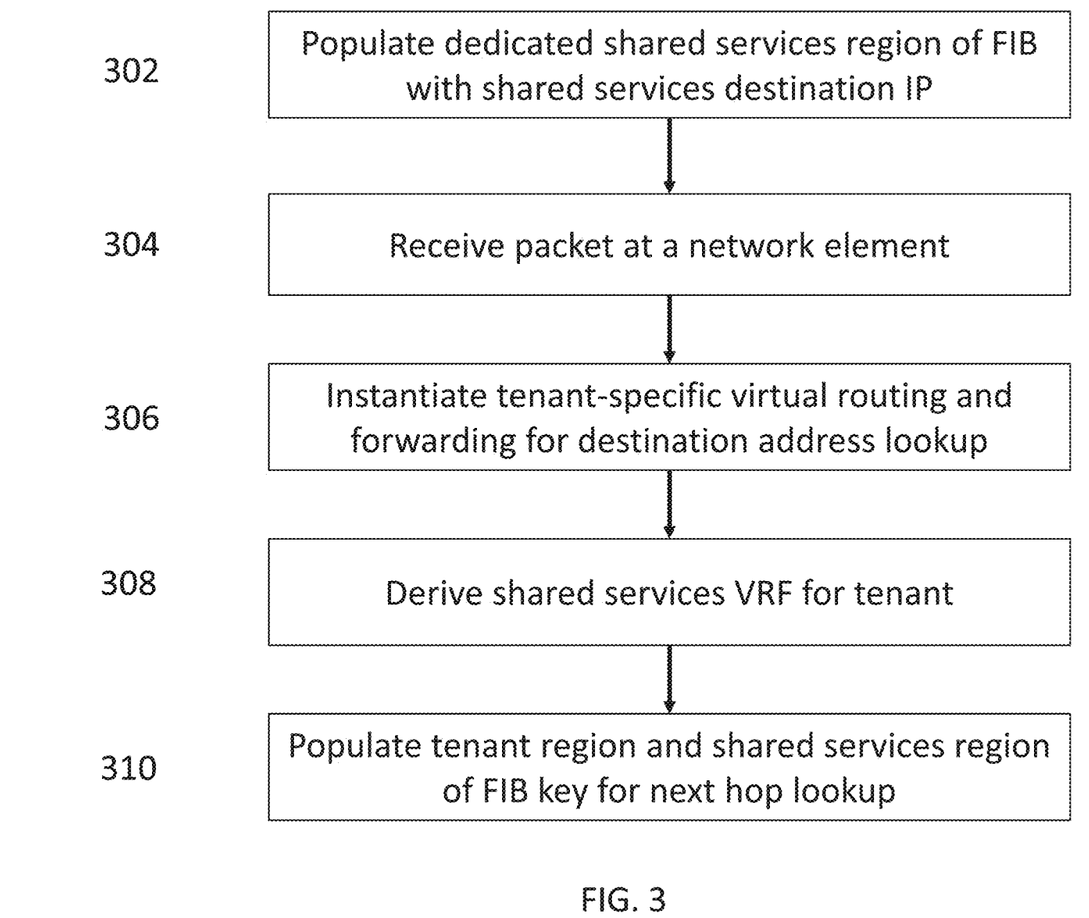
FIG. 3 is a process flow diagram for programming a forward information base of a network element in accordance with embodiments of the present disclosure.

FIG. 3 is a process flow diagram for programming a forward information base key of a network element in accordance with embodiments of the present disclosure. IP addresses for shared services network locations can be stored in a dedicated region (e.g., allocation) of the forwarding information base (FIB) in a TOR/EOR ASIC (302). When a packet is received (304), the tenant-specific virtual routing and forwarding (VRF) table can be instantiated (306). A shared services VRF can also be derived and instantiated based on the tenant-specific VRF (308). The shared services VRF can include shared services network location information for authorized next hop forwarding of the packet. A FIB key can be populated with the tenant-specific VRF and the shared services VRF for FIB lookup (310).

Figure 4:
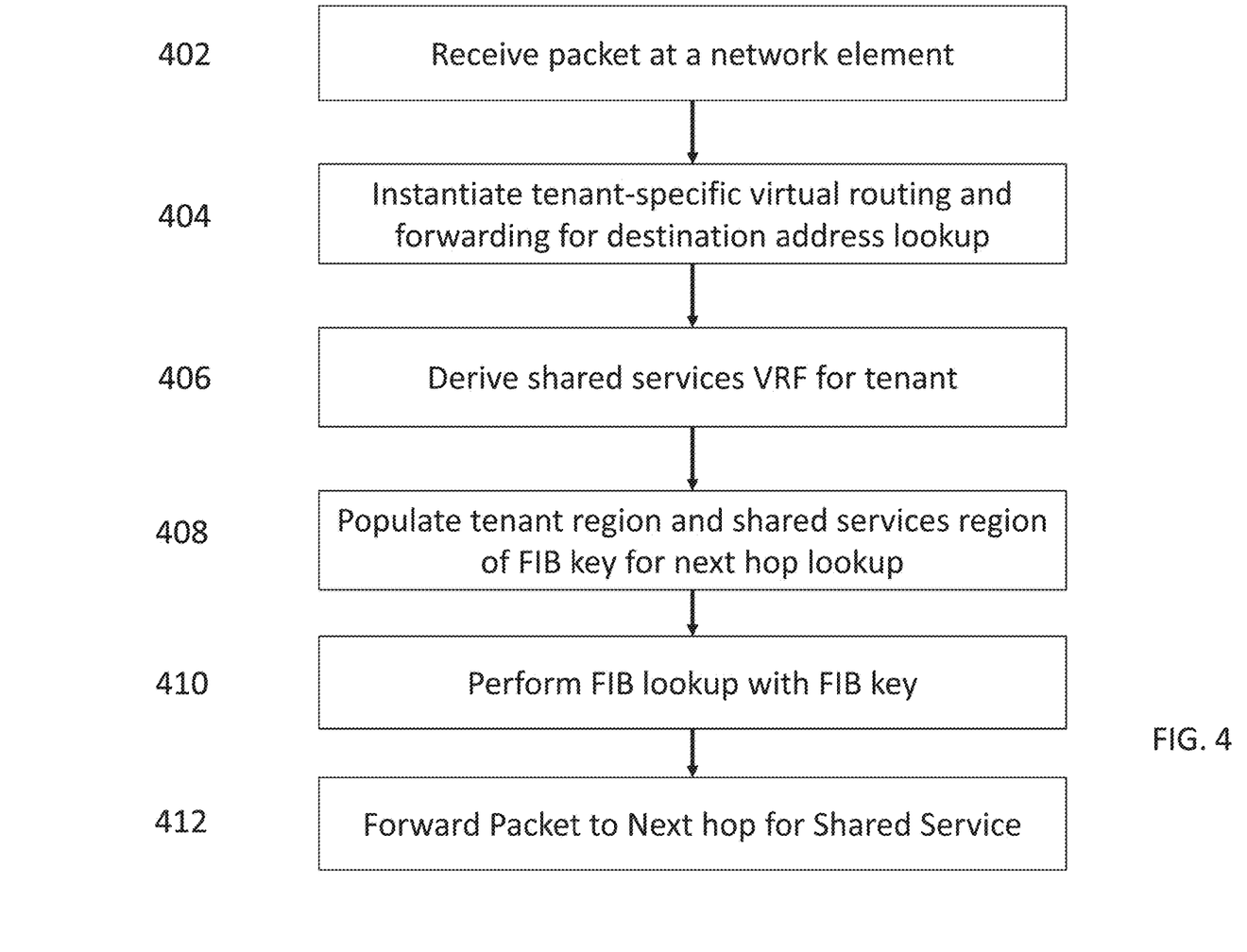
FIG. 4 is a process flow diagram for routing a packet to a shared service destination using a forward information base in accordance with embodiments of the present disclosure.

FIG. 4 is a process flow diagram for routing a packet to a shared service destination using a forward information base in accordance with embodiments of the present disclosure. Once a packet is received at the network element (e.g., TOR, EOR, etc.) (402), the tenant-specific virtual routing and forwarding (VRF) table can be instantiated (404). Instantiating the tenant-specific VRF can be used to determine the presence of a shared service destination for the packet. A shared services VRF can be derived and instantiated based on the tenant-specific VRF (406). The shared services VRF can include shared services network location information for authorized next hop forwarding of the packet. A FIB key can be populated with the tenant-specific VRF and the shared services VRF for FIB lookup (408). A lookup in the FIB can be performed using the FIB key (410). In some embodiments, a parallel lookup is performed because the TOR does not know intrinsically whether the packet is destined for a shared services network location. If there is a hit in the shared services region, the FIB applies the next hop IP address for the shared services server, and forwards the packet (412). If there is a hit in the tenant-specific region, the FIB applies the IP address of the next hop for the tenant-specific destination, and forwards the packet.

Figure 5:
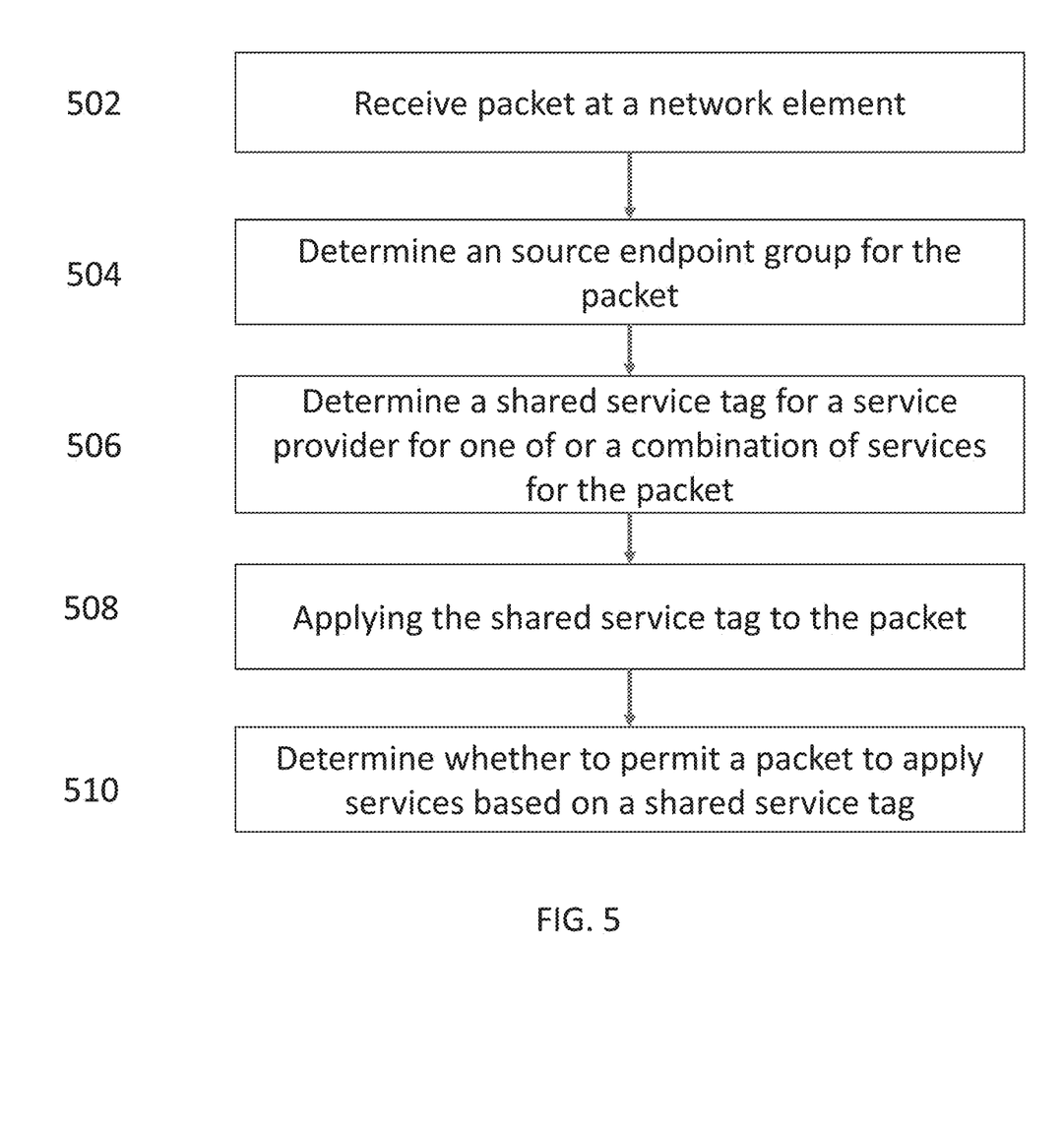
FIG. 5 is a process flow diagram for applying one or more policies to a packet in accordance with embodiments of the present disclosure.

FIG. 5 is a process flow diagram for applying one or more policies to a packet in accordance with embodiments of the present disclosure. A packet can be received at a network location, such as a TOR switch in a data center fabric (502). A forwarding information base (FIB) that is part of the TOR switch can determine that the packet has a shared service next hop destination location. The FIB can identify an endpoint group (EPG) tag in the packet metadata that identifies customer-side share services information (504). The EPG tag can be a 16 bit number representing authorized shared services for the EPG or the tenant. The FIB can translate the EPG tag from a customer-side tag to a shared service provider tag (e.g., to an EPG tag that is recognizable by the shared service network element) (506). The new EPG tag can be applied to the packet prior to forwarding the packet to the next hop (508). The receiving TOR (or, more generally, the shared service providing network element) can determine whether to apply services to the packet based on the EPG tag applied to the packet by the FIB (510).

Figure 6:
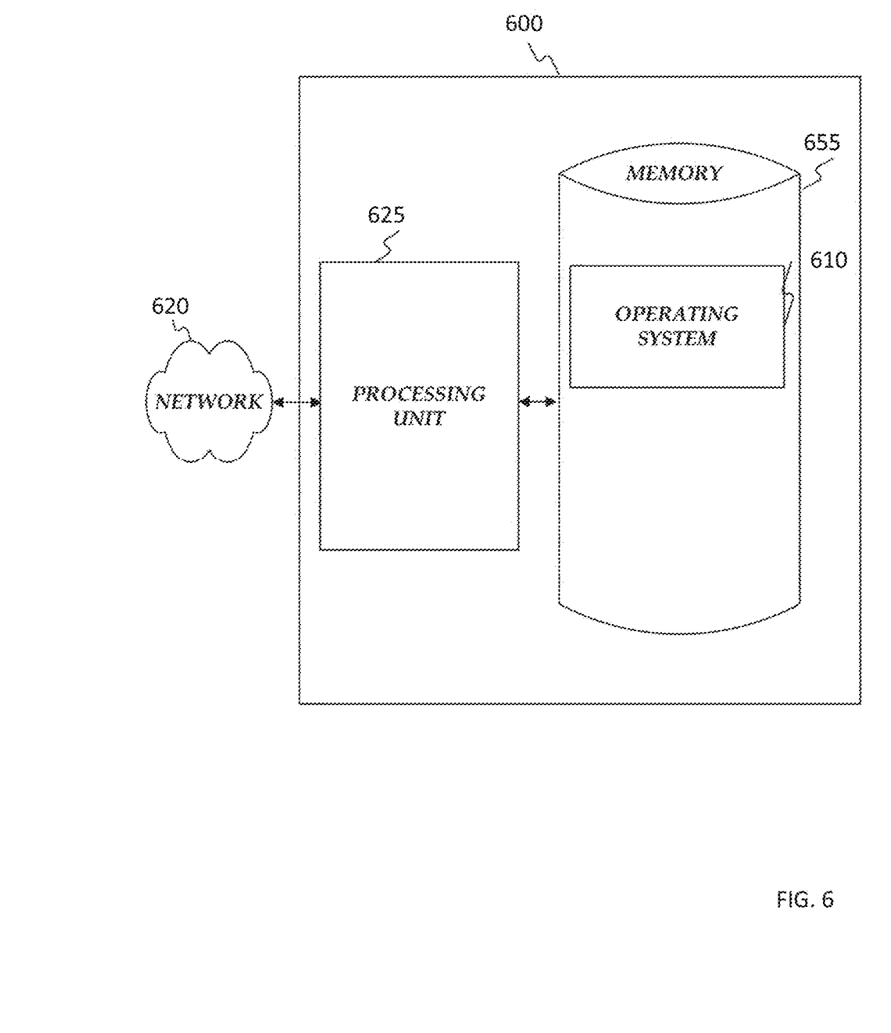
FIG. 6 is a schematic block diagram of a computing device in accordance with embodiments of the present disclosure.

FIG. 6 is a schematic block diagram of a computing device 600 in accordance with embodiments of the present disclosure. FIG. 6 illustrates a computing device 600, such as a server, host, or other network devices described in the present specification. Computing device 600 may include processing unit 625 and memory 655. Memory 655 may include software configured to execute application modules such as an operating system 610. Computing device 600 may execute, for example, one or more stages included in the methods as described above. Moreover, any one or more of the stages included in the above describe methods may be performed on any element shown in FIG. 6.

Computing device 600 may be implemented using a personal computer, a network computer, a mainframe, a computing appliance, or other similar microcomputer-based workstation. The processor may comprise any computer operating environment, such as hand-held devices, multi-processor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
   receiving a packet at a network element of a packet-switched network;
   based on information in the packet, instantiating a tenant-specific virtual routing and forwarding (VRF) instance;
   performing, using the tenant-specific VRF instance, a tenant-specific lookup in a dedicated tenant-specific region of a multi-tenant forwarding information base (FIB) to determine whether or not the packet is directed to a shared service;
   in response to determining that the packet is directed to a shared service, deriving a shared service VRF instance for the packet from the tenant-specific VRF instance;
   using the shared service VRF instance, performing a shared service lookup in a dedicated shared services region of the FIB to identify a shared service destination address for the packet; and
   forwarding the packet to the shared service destination address,
   wherein the shared service destination address is only stored once in the FIB and is associated with multiple tenant-specific VRF instances.

2. The method of claim 1, further comprising
   identifying a source internet protocol (SIP) address for the packet;
   determining a shared service tag for the shared service destination, the shared service tag identifying one or more shared services associated with the SIP address of the packet; and
   applying the shared service tag to an endpoint group tag associated with the SIP address for the packet.

3. The method of claim 1, wherein performing a tenant-specific lookup in the dedicated tenant-specific region of the FIB includes:
   identifying a destination internet protocol (DIP) address for the packet.

4. The method of claim 1, wherein performing the shared service lookup in the dedicated shared services region of the FIB to identify a shared service destination address for the packet comprises:
   performing a lookup to identify a shared service IP address, wherein the shared service IP address is only stored once in the FIB and is associated with multiple tenant-specific VRF instances.

5. The method of claim 1, further comprising:
performing the tenant-specific lookup in the dedicated tenant-specific region of the FIB using a forwarding information base (FIB) key populated with the tenant-specific VRF instance.

6. The method of claim 5, further comprising:
performing the shared service lookup in the dedicated shared service region of the FIB using the FIB key, wherein the FIB key is also populated with the shared service VRF instance.

7. The method of claim 6, further comprising:
performing the shared service lookup and the tenant-specific lookup in parallel.

8. A network element comprising:
an application specific integrated circuit (ASIC) comprising a multi-tenant forwarding information base (FIB), wherein the FIB includes:
a tenant-specific region storing tenant-specific destination address information populated based on tenant-specific virtual routing and forwarding (VRF) instances; and
a shared service region storing global shared service destination address information populated based on one or more shared service VRF instances, the one or more shared service VRF instances each being derived from one of the tenant-specific VRF instances, and wherein the shared service region comprises a next hop destination for a shared service destination,
wherein the network element is configured to:
receive a packet;
based on information in the packet, instantiate a tenant-specific virtual VRF instance;
perform, using the tenant-specific VRF instance, a tenant-specific lookup in the tenant-specific region of the FIB to determine whether or not the packet is directed to a shared service;
in response to determining that the packet is directed to a shared service, derive a shared service VRF instance for the packet from the tenant-specific VRF instance;
using the shared service VRF instance, perform a shared service lookup in the shared services region of the FIB to identify a shared service destination address for the packet; and
forward the packet to the shared service destination,
wherein the shared service destination address is only stored once in the FIB and is associated with multiple tenant-specific VRF instances.

9. The network element of claim 8, wherein the network element is configured to:
identify a source internet protocol (SIP) address for the packet;
determine a shared service tag for the shared service destination, the shared service tag identifying one or more shared services associated with the SIP address of the packet; and
apply the shared service tag to an endpoint group tag associated with the SIP address for the packet.

10. The network element of claim 8, wherein to perform a tenant-specific lookup in the tenant-specific region of the FIB, the network element is configured to:
identify a destination internet protocol (DIP) address for the packet.

11. The network element of claim 8, wherein to perform the shared service lookup in the shared services region of the FIB to identify a shared service destination address for the packet, the network element is configured to:
perform a lookup to identify a shared service IP address, wherein the shared service IP address is only stored once in the FIB and is associated with multiple tenant-specific VRF instances.

12. The network element of claim 8, wherein the network element is configured to:
perform the tenant-specific lookup in the tenant-specific region of the FIB using a forwarding information base (FIB) key populated with the tenant-specific VRF instance.

13. The network element of claim 12, wherein the network element is configured to:
perform the shared service lookup in the shared services region of the FIB using the FIB key, wherein the FIB key is also populated with the shared service VRF instance.

14. The network element of claim 13, wherein the network element is configured to:
perform the shared service lookup and the tenant-specific lookup in parallel.

15. A data center fabric comprising:
a network element configured to receive a packet from a tenant server, the network element comprising:
an application specific integrated circuit (ASIC) comprising a multi-tenant forwarding information base (FIB);
the FIB comprising:
a tenant-specific region storing tenant-specific destination address information populated based on tenant-specific virtual routing and forwarding (VRF) instances; and
a shared service region storing global shared service destination address information populated based on one or more shared service VRF instances, the one or more shared service VRF instances each being derived from one of the tenant-specific VRF instances, and wherein the shared service region comprises a next hop destination for a shared service destination; and
a shared services network element comprising a shared services server configured to:
receive a packet;
based on information in the packet, instantiate a tenant-specific virtual VRF instance;
perform, using the tenant-specific VRF instance, a tenant-specific lookup in the tenant-specific region of the FIB to determine whether or not the packet is directed to a shared service;
in response to determining that the packet is directed to a shared service, derive a shared service VRF instance for the packet from the tenant-specific VRF instance;
using the shared service VRF instance, perform a shared service lookup in the shared services region of the FIB to identify a shared service destination address for the packet; and
forward the packet to the shared service destination address,
wherein the shared service destination address is only stored once in the FIB and is associated with multiple tenant-specific VRF instances.

16. The data center fabric of claim 15, wherein the shared services network element is configured to:
identify a source internet protocol (SIP) address for the packet;
determine a shared service tag for the shared service destination, the shared service tag identifying one or more shared services associated with the SIP address of the packet; and
apply the shared service tag to an endpoint group tag associated with the SIP address for the packet.

17. The data center fabric of claim 15, wherein to perform a tenant-specific lookup in the tenant-specific region of the FIB, the shared services network element is configured to:
    identify a destination internet protocol (DIP) address for the packet.

18. The data center fabric of claim 15, wherein to perform the shared service lookup in the shared services region of the FIB to identify a shared service destination address for the packet, the shared services network element is configured to:
    perform a lookup to identify a shared service IP address, wherein the shared service IP address is only stored once in the FIB and is associated with multiple tenant-specific VRF instances.

19. The data center fabric of claim 15, wherein the shared services network element is configured to:
    perform the tenant-specific lookup in the tenant-specific region of the FIB using a forwarding information base (FIB) key populated with the tenant-specific VRF instance.

20. The data center fabric of claim 19, wherein the shared services network element is configured to:
    perform the shared service lookup in the shared services region of the FIB using the FIB key, wherein the FIB key is also populated with the shared service VRF instance.

* * * * *